: 3,044,993
**MANUFACTURE OF LINEAR POLYCONDENSA-
TION PRODUCTS**
Heine Gerke Nicolai Tiemersma, Arnhem, Netherlands,
assignor to American Enka Corporation, Enka, N.C.,
a corporation of Delaware
Filed Sept. 22, 1958, Ser. No. 762,295
Claims priority, application Netherlands Sept. 28, 1957
1 Claim. (Cl. 260—78)

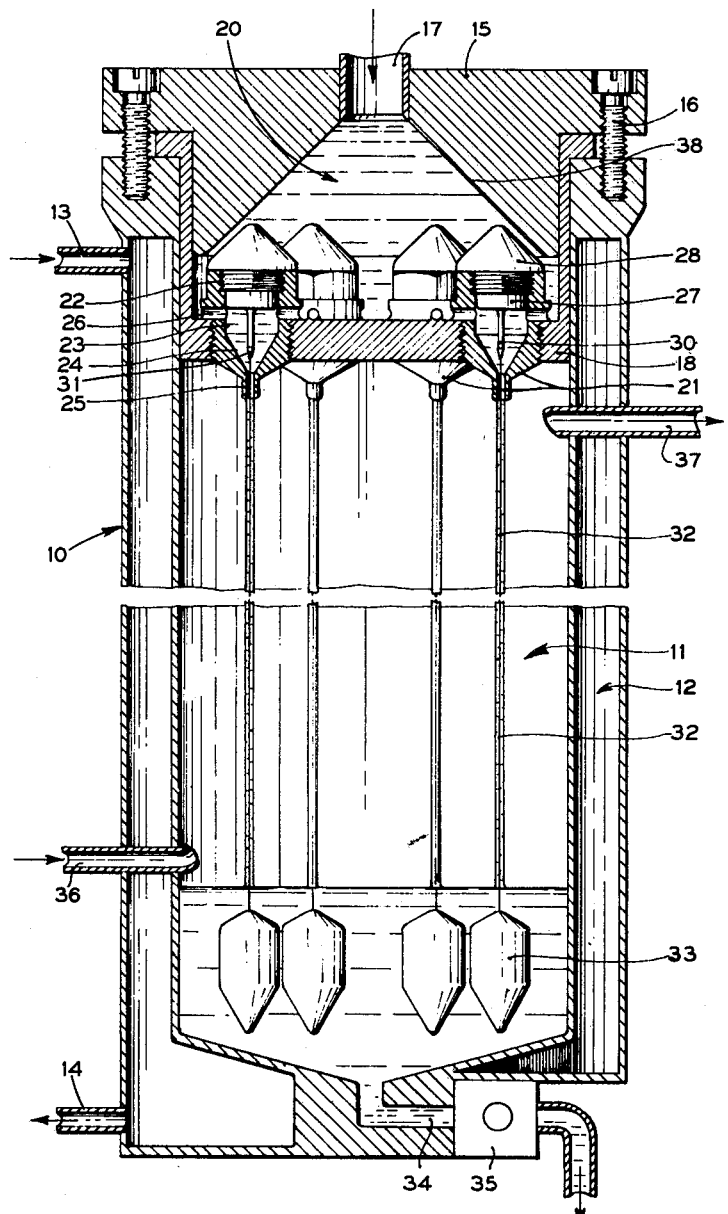

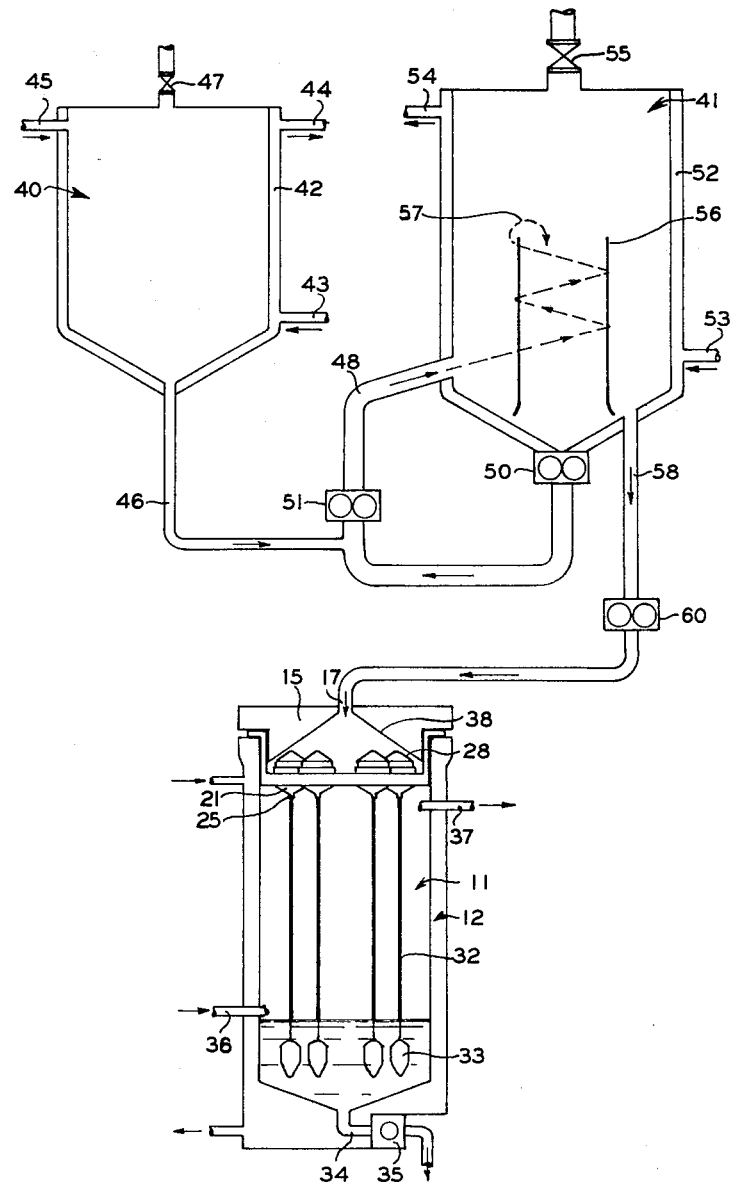

This invention relates generally to the manufacture of linear polycondensation products and more particularly to a process and apparatus for manufacturing polyamides from diamines and dicarboxylic acids.

In the manufacture of products of the type herein under consideration, it is known to flow liquid containing one or more polycondensation product forming substances, or a precondensate thereof, in the form of a surrounding layer over the surface of a vertically arranged elongated member under circumstances which promote polycondensation. In the operation of one such known system a precondensate of substances which ultimately produce polycondensation products is caused to flow in a thin layer over heated tubes. The ratio of the thickness of the liquid to the diameter of the tube is very small. A chemical reaction transforming the precondensate to polycondensation occurs during the flow of liquid over the tubes.

While the reaction velocity of the above-described system generally is undesirably slow, it has been found that the same can be increased if, while maintaining the same liquid layer thickness-tube diameter ratio, the latter diameter is decreased. The present invention employs this discovery and utilizes an extremely small diameter member over which the liquid mixture is flowed.

A disadvantage to the foregoing system, however, is that the polycondensation products thus obtained, just as the polycondensation products manufactured in the conventional manner, contain a relatively high percentage of impurities or substances whose properties deviate from those of the desired polymer.

A primary object of the present invention is to provide a process and apparatus for the manufacture of linear polycondensation products not having the disadvantages of known systems.

Another object of this inventoin is to provide a process for more rapid continuous production of polycondensation products.

Still another object of the present invention is to provide a process for the manufacture of linear polycondensation products having a low percentage of impurities.

A further object of this invention is to provide a process which will insure a uniform thickness of liquid precondensate flowing through a reaction chamber.

These and other objects can be accomplished if, in accordance with the present invention, the mixture to be subjected to polycondensation is fed, or flows, over the elongated member in a uniform layer having a thickness which is large in proportion to the diameter of the member. It is preferred that the elongated member consist of a wire or thread having a diameter which is very small in comparison with the thickness of conventional elongated members used for this purpose.

Although there are many advantages to the use of a very thin wire or thread such as described above, there also are limitations concomitant with this use. For example, the mechanical strength of the wire itself is an important consideration. Moreover, if the liquid layer thickness is increased, the time required for the mixture to reach the desired degree of polymerization, or the time during which the mixture remains on the wire, must be increased accordingly. Consequently, the dead weight or load on the wire increases not only because of the increased liquid layer thickness, but also because of the greater length of mixture necessary to produce the required polymerization.

With the foregoing limitations in mind, it is preferred that the ratio of the outer diameter of liquid layer with respect to the wire diameter lie between 40 and 60, and that the diameter of the wire lie between 0.1 and 0.3 mm. It can be seen from these figures that the liquid layer thickness remains small when considered in an absolute sense, but actually is relatively large when compared to the wire diameter.

In the use of a condensation vessel constructed within the ratio range described above the fraction of polymer which remains on the thread longer than five times the average period is less than about 0.02%. For purposes of comparison, this amount would be about 4% if the mixture were passed over a smooth, vertically arranged plate or tube. In view of this reduced percentage, the quantity of impurities or undesirable substances in the polycondensation product manufactured according to this invention is smaller than when polycondensation is effected, at least in part, while the precondensate flows over a tubular body of larger diameter.

In the performance of the process described above, irregularities in liquid thickness may sometimes occur, these irregularities consisting in alternate thick and thin portions appearing in the direction of liquid flow. This phenomenon, which results in polycondensation products having a higher content of undesirable substances, may be obviated if, according to the present invention, a precondensate having an initial viscosity of more than 200 poises is subjected to further polycondensation on the thread-shaped elongated member described.

The process of this invention is particularly applicable to the manufacture of polyamides from hexamethylenediamine and adipic acid. It is also useful, however, for the manufacture of other linear polycondensation products, such as polyamides from lactams, and from polyesters, especially polyethylene-terephthalates. The most favorable results are obtained in the first-mentioned use of this invention if a precondensate of hexamethylenediamine and adipic acid, obtained in any conventional manner, with a temperature of 275° C. and a specific viscosity of 1.6 is passed in the form of a surrounding layer or jacket measuring 8 mm. in diameter over the entire peripheral area of a steel wire measuring 0.15 mm. in diameter and 300 cm. in length, while nitrogen at atmospheric pressure is passed over the surface of the condensate in a direction opposite to that of the liquid flow.

Under the conditions enumerated above, the average time during which the precondensate remains on the wire amounts to approximately 8 minutes. During this time the specific viscosity increases from 1.6 to 2.15. This viscosity may be determined with the aid of a solution of 1% by weight of the polyamide in 90% by weight of formic acid.

The preferred apparatus of this invention comprises a condensation vessel having a reaction chamber provided with supply and discharge conduits, a plurality of vertically disposed elongated members or wires, suitable means for supplying a viscous mass to the peripheral area of the wires, and means for collecting the mixture after passage of the same over the wires. It is very important that the elongated members be disposed exactly vertical in order to prevent variations in liquid layer thickness around the periphery thereof. Although this exact vertical arrangement can be obtained in a number of different ways, it is preferred that the wires be suspended from the upper ends and that a streamlined weight or plumb-bob be attached coaxially to the lower end of each. With this construction, the effect of gravity on the plumb-bob will perform the same vertical alignment which otherwise might require expensive equipment. Inasmuch as streamlined plumb-bobs are contemplated, the same may be disposed either below or above the surface of material collected beneath the wires.

As stated hereinabove, it is preferred that each wire measure 0.15 mm. in diameter and have a length of 300 cm. Wires of this size can be easily and accurately straightened, thereby assuring an undisturbed flow of the substances subjected to polycondensation. Moreover, by utilizing this small diameter wire, it is possible to employ a liquid layer thickness-wire diameter ratio which favors a reduction in the content of impurities and yet which does not require a very large absolute polymer thickness, this being desired with regard to the speed of, or time interval required for, polycondensation. Under the circumstances mentioned supra, reaction velocity is such that a wire length of only 300 cm. is sufficient.

For a more detailed explanation of this invention, attention is directed to the accompanying drawings, wherein FIGURE 1 is a sectional view, in elevation, illustrating a preferred embodiment of a reaction chamber or aftercondensation vessel constructed in accordance with the teachings of this invention; and FIGURE 2 is a schematic view, in elevation, illustrating a preferred arrangement of the aftercondensation vessel shown by FIGURE 1 in combination with precondensate and polycondensate vessels.

The generally cylindrical aftercondensation vessel 10 shown in section by FIGURE 1 comprises a reaction chamber 11 and a heating jacket 12 which coaxially surrounds the same. The heating jacket may be connected, if desired, through conduits 13, 14 to a Dowtherm heating system, not illustrated in the drawings. Aftercondensation vessel 10 is closed at the upper end thereof by a hollow cap or cover 15, which is fastened by bolts 16, as shown. Cover 15 is suitably apertured to receive supply tube 17, through which a mixture either of substances forming polycondensation products or a precondensate thereof can be introduced into the interior thereof.

An apertured circular plate 18 is mounted between the cover 15 and the vessel 10, in the manner shown, and serves as a bottom for a supply chamber 20. Plate 18 is provided, in the embodiment shown, with six symmetrically arranged threaded apertures (only two of which appear in section) within each of which is mounted a hollow centering bushing 21. The interior of each bushing 21 is provided with a threaded upper section 22, a cylindrical section 23, a tapered or conical section 24, and a more narrow cylindrical section 25. At the level of cylindrical section 23, a plurality of symmetrically arranged radial ports 26 are formed through the wall of the bushing.

A centering pin 27, having threads which cooperate with the threaded section 22, is screwed into each centering bushing 21. The upper external portion of each pin 27 consists of a conical distribution cap 28, flared outwardly as shown in order to overlie the bushing 21 and to rest on the upper surface thereof. The threaded portion of pin 27 is designed to lie slightly above radial ports 26 in order not to impede the flow of liquid therethrough. The lower section or stem 30 of centering pins 27 is generally cylindrical, having a much smaller diameter than the upper or threaded section, and terminates in a tapered tip 31, as shown. Moreover, this diameter is such that an annular space remains between the tip 31 of pin 27 and the conical section 24 of bushing 21.

A steel thread or wire 32 is fixed in the exact center of each tip portion 31. In the preferred embodiment, a wire of 0.15 mm. diameter has proved satisfactory, as explained hereinabove. The stem 30 of pin 27 should lie concentrically with respect to the lower cylindrical section 25 of bushing 21, in which case the inner surface of this cylindrical section and the steel wire 32 together define an annular space or opening which is exactly concentric with the wire.

The lower or free end of each wire 32 is provided with a streamlined plumb-bob 33 which functions to maintain an exact vertical disposition of the wires, and an exact concentric relationship between the wire and cylindrical section 25 of bushing 21. This of course insures that the boundaries of the annular space mentioned above will remain concentric in order to provide uniform thickness of the liquid fed down the wires. In the operation of the embodiment disclosed, plumb-bobs 33 are slightly submerged below the level of liquid in the reaction chamber 11.

A discharge conduit 34 and suitable pump 35 are provided at the lower end of vessel 10 for removing the melt and supplying the same to suitable equipment for spinning purposes. Tubes 36, 37 are provided for supplying gaseous material, such as nitrogen, to and for removing the same from the reaction chamber, as is known to this art. The hollow cover 15 is tapered in the manner indicated by reference numeral 38 to eliminate dead pockets and thereby prevent accumulation of encrustations.

Due to the presence of tapered surface 38 and conical distribution caps 28, the precondensate supplied is evenly divided over the space between centering bushings 21. From the supply chamber 20 the precondensate enters the bushings 21 through radial ports 26, and discharges through section 25 in the form of an annular film or layer surrounding the wires 32.

With attention now directed to FIGURE 2, further explanation of the present invention will be given in connection with precondensate and polycondensate vessels 40, 41, respectively. These vessels, per se, form no part of this invention and are clearly described and claimed in copending application Serial No. 678,426, filed August 15, 1957, which is owned in common with this case. In order to clarify operation of the novel vessel 10 disclosed herein, however, the function of vessels 40, 41 will be outlined briefly hereinbelow.

High pressure precondensation vessel 40 is surrounded by a heating jacket 42 and may be supplied with Dowtherm or other heating material through conduits 43, 44. The liquid composition to be polycondensated is supplied to this vessel through conduit 45 and is withdrawn through discharge conduit 46. Control valve 47 insures constant pressure within the vessel 40.

Discharge conduit 46 of vessel 40 connects with recycling conduit 48 of low pressure polycondensation vessel 41. Conduit 48 receives condensation material from the lower end of vessel 41 and returns this material, along with that precondensate received from conduit 46, to the vessel, as shown. Suitable pumps 50, 51, are provided for this purpose, as fully explained in the aforesaid copending application. Vessel 41 is also provided with a heating jacket, as shown at 52, which may be supplied heat through heater conduits 53, 54. Moreover, a pressure release valve 55, functioning in the manner explained above, is connected to the upper end of vessel 41.

The recycling conduit 48 and pumps 50, 51 function to mix the liquid flowing through discharge conduit 46 with the liquid from vessel 41 thoroughly before a pressure reduction occurs. Pump 51 of course must operate at higher capacity than pump 50. As a result of this mixing system, the temperature drop induced by evaporation of the liquids is held to a minimum. Cylindrcial tube 56 is provided within vessel 41 to further separate the vaporous components contained therein. Liquid enters this tube in the manner shown by arrow 57. Low pressure vessel 41 is provided with a discharge conduit 58 which supplies the polycondensation products emerging therefrom through pump 60 to the supply chamber 20 of vessel 10. For a further description of vessels 40, 41, attention is invited to the aforesaid copending application.

As a specific example of operation, an aqueous solution containing 60% of equivalent quantities of hexamethylene diamine and adipic acid, and 0.5 mol percent acetic acid as a stabilizer, was prepared. This solution was fed into high pressure reaction vessel 40 and the contents within this vessel were maintained at 18 atmospheres pressure at a temperature of 250° C. by means of heated Dowtherm vapor circulated through the heating jacket 42. Dowtherm of course is, essentially, a high boiling mixture of diphenyl and diphenyl oxide.

The precondensate formed in vessel 40 remained therein for an average period of one hour, after which it was continuously discharged through conduit 46. Polycondensation liquid from low pressure vessel 41, which had already been subjected to an evaporation process, was continuously recycled through recycling conduit 48 by means of pumps 50, 51. The pre-condensate liquid from vessel 40 and discharge conduit 46 was united with the recycled liquid at a point in conduit 48 between these two pumps.

Pump 51 was operated at a capacity 11% higher than that of pump 50, which resulted in a mixture of ten times as much polycondensation product from vessel 41 as precondensate from vessel 40. The material in vessel 41 was maintained at 275° C. and at atmospheric pressure. After an average time interval of one hour, the polycondensation product was fed by pump 60 to the aftertreatment or aftercondensation vessel 10, which was also maintained at 275° C. by Dowtherm vapor.

The specific viscosity of the polycondensation product entering vessel 10 through supply tube 17 amounted to 1.6, the melt viscosity being approximately 200 poises. The diameter of the narrow cylindrical portion 25 was so proportioned to the diameter of the corresponding wire 32 that the diameter of the resulting liquid layer surrounding the wires was 8 mm. Further, the wires were 300 cm. in length, while the plumb-bobs 33 weighed about 80 grams. Under these conditions, the average time interval which the polycondensation products remained on the wires amounted to about 8 minutes, during which time the average specific viscosity increased from 1.6 to 2.15.

While the foregoing illustrates a prefererd operation of the reaction chamber herein described, it is not to be taken as an indication of the limitations thereof. It is possible of course, to feed the precondensate substances directly to supply tube 17, thus bypassing both vessels 40, 41, or to utilize the novel vessel 10 in combination with either of the former. It has been found that a material supply of 10 kg./hour operates very satisfactorily.

Inasmuch as other modifications will become apparent to those skilled in this art, it is intended that the scope of the present invention be limited only to the extent set forth in the following claim.

What is claimed is:

A process for increasing viscosity of linear condensation products comprising the steps of continuously flowing a condensate of hexamethylene diamine and adipic acid in the form of an annular film vertically through a reaction chamber maintained at about 275° C. and at about atmospheric pressure, the initial specific viscosity of said condensate at the chamber temperature being approximately 1.6 and the ratio of the outer film diameter to the inner film diameter being between 40 and 60 with the inner diameter measuring between 0.1 and 1.3 mm., and passing nitrogen over the flowing solution in a direction countercurrent to the flow thereof to remove water vapor and thereby permit a rapid increase in viscosity of the condensate whereby polycondensation of said condensate occurs to the extent necessary for increasing the specific viscosity from 1.6 to 2.15 when determined with the aid of a solution of 1% by weight of said polycondensate in 90% by weight of formic acid.

References Cited in the file of this patent

UNITED STATES PATENTS

| | | |
|---|---|---|
| 253,790 | Von Krause et al. | Feb. 14, 1882 |
| 1,568,787 | Wilderman | Jan. 5, 1926 |
| 2,545,006 | Ryan | Mar. 13, 1951 |
| 2,719,776 | Kummel | Oct. 4, 1955 |
| 2,731,081 | Mayner | Jan. 17, 1956 |
| 2,749,212 | Crowder | June 5, 1956 |
| 2,810,630 | Herele | Oct. 22, 1957 |

FOREIGN PATENTS

| | | |
|---|---|---|
| 623,448 | Germany | Dec. 20, 1935 |
| 797,743 | Great Britain | July 9, 1958 |
| 1,023,648 | France | Mar. 20, 1953 |